United States Patent [19]

Hejj et al.

[11] 3,841,224

[45] Oct. 15, 1974

[54] VEHICLE CONTROLLED SWITCH SYSTEM

[75] Inventors: Erwin Hejj; Dieter Sigl; Hans Soddemann; Dieter Zimek, all of Essen, Germany

[73] Assignee: Fried. Krupp Gesellschaft mit beschrankter Haftung, Essen, Germany

[22] Filed: Oct. 10, 1972

[21] Appl. No.: 296,090

[30] Foreign Application Priority Data
Oct. 9, 1971 Germany.......................... 2150407

[52] U.S. Cl.................... 104/105, 104/130, 104/89, 104/148 MS
[51] Int. Cl............................................ E01b 25/22
[58] Field of Search ............ 104/88, 105, 130, 118, 104/119, 120, 89, 95, 148 LM, 148 MS, 148 SS

[56] References Cited
UNITED STATES PATENTS

| 3,500,765 | 3/1970 | Easton | 104/130 |
| 3,593,665 | 7/1971 | Marty | 104/88 |
| 3,702,099 | 11/1972 | Ricaud | 104/148 LM |

*Primary Examiner*—Lloyd L. King
*Assistant Examiner*—D. W. Keen
*Attorney, Agent, or Firm*—Walter Becker

[57] ABSTRACT

In combination with a guided transport vehicle and with track means having a first track and at least one second track branching off from the first track, a switch system in which a first member in the form of a permanent member and a second member in the form of soft magnetic material are normally in magnetic cooperation with each other for pulling the vehicle into the second track, the arrangement being such that one of said members is connected to that one vehicle side which faces toward the second track whereas the other member is connected to that side of the track means which is closest to said one member, power operable means being provided which are selectively operable from the vehicle to interrupt magnetic cooperation between the first and second member.

8 Claims, 4 Drawing Figures

VEHICLE CONTROLLED SWITCH SYSTEM

The present invention relates to a vehicle controlled switch which operates in a positive and contact-free manner and is intended for railraods with separate support and track guidance.

The primary advantage of vehicle controlled switches is seen in the fact that the entire track is at rest and therefore needs no checking, servicing and control. On the other hand, vehicle controlled branching off tracks make it necessary that, even when the actuating elements should fail, a definite driving direction is assured.

It is, therefore, an object of the present invention to provide a positive and contact-free operating switch which will meet the above mentioned requirements.

This object and other objects and advantages of the invention will appear more clearly from the following specification in connection with the accompanying drawing, in which.

Figure 1:
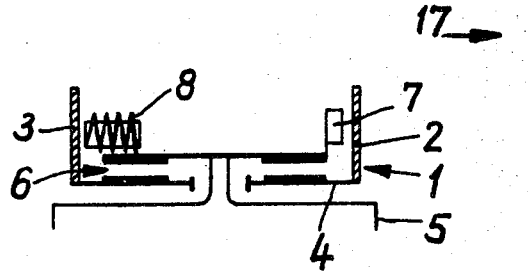
FIG. 1 illustrates a diagrammatic cross section through a magnetically suspended guided transport vehicle and track according to the invention.

The switch according to the present invention is characterized primarily in that the vehicle, in case of a failure of the control energy, is adapted by means of one or a system of permanent magnets to be guided into a predetermined direction (emergency direction), while the track guiding elements of the track which serve as switch guiding means are within the area of the branching off track provided with soft magnetic material.

The switch according to the invention is simple in construction and safe in operation. Moreover, the switch is substantially free from wear and needs no servicing, and has the further advantage that it can be used for all velocity ranges.

The invention may advantageously be realized in various ways. Thus, according to the present invention, the permanent magnet may be fixedly connected to that side of the vehicle which is on the emergency track side, and a controlled electromagnet of corresponding power may be fixedly connected to that side of the vehicle which is on the selective track side. If at the branching-off areas the right-hand branch track is intended as emergency side, the left-hand branch represents the selective track side. According to plan, the vehicle is driven onto the left-hand branch of the track due to the fact that the electromagnet receiving voltage guides the vehicle against the force of the permanent magnet along the left-hand or selective branch of the track. For a regular driving or planned driving on the right-hand branch of the track the electromagnet remains disengaged. The permanent magnet will in this instance guide the vehicle along the right-hand or emergency track section. However, also when the control current fails, the vehicle will by means of the permanent magnet in a simple and safe manner be guided in the direction predetermined for such an emergency, namely the emergency direction.

Another advantageous realization of the invention consists in that on the vehicle and in a direction transverse to the driving direction of the vehicle there is displaceably arranged a coupling bar which has both ends thereof respectively provided with a permanent magnet associated with the respective track guiding part, while a rest position spring engages the coupling bar toward the emergency side and a power device is adapted to actuate the coupling bar against the spring toward the selective side. This design takes advantage of the fact that the force of attraction of a magnet greatly decreases with the distance from the magnet. The permanent magnets are respectively arranged at different distances from the associated track guiding parts in such a way that the permanent magnet with the shorter distance will guide the vehicle on its track guiding part, whereas the permanent magnet on the other side of the vehicle will in view of its greater distance relative to the associated track guiding part have no practical effect. If the control current fails, the rest position spring will displace the coupling bar in such a way that the permanent magnet associated with the emergency track side will be moved closer this side and the vehicle will be guided by this permanent magnet into the emergency track branch.

Still another design of the invention which represents a modification of the just described design is characterized by a coupling bar which is displaceably arranged on the vehicle in a direction transverse to the driving direction. This coupling bar has its ends respectively provided with a permanent magnet associated with the corresponding track guiding part. The coupling bar is by means of a locking mechanism adapted to be disengaged by a control device kept in such a rest position that the magnet on the emergency side has a shorter distance from its track guiding part than the magnet on the selective side has from its track guiding part. The arrangement is furthermore characterized in that the track guiding parts of the track within the range of the branching-off point are provided with soft magnetic material in such a way that the soft magnetic material starts closer to the branching-off point at the selective side than on the emergency side, and that furthermore in the selective direction following the branching-off point on the emergency side there is provided a soft magnetic wall piece by means of which the coupling bar can due to its permanent magnet on the emergency side be retracted to its locked rest position.

Within the framework of the present invention and its more specific embodiments, it may be advantageous to arrange the permanent magnets on the track guiding parts of the track and to arrange the soft magnetic material associated with the track guiding parts on the vehicle. In this way a simple and light construction of the vehicle is obtained which is particularly advantageous when the vehicles follow each other at short intervals.

Figure 2:
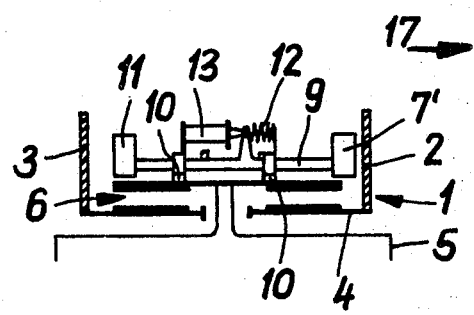
FIG. 2 illustrates a modification over the design of FIG. 1.
Figure 3:
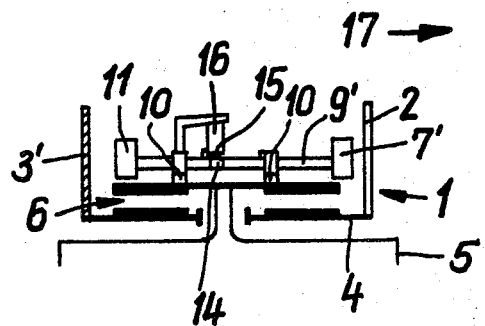
FIG. 3 represents a section taken along the line III — III of FIG. 4 with the upper part of the vehicle added thereto, FIG. 3 illustrating a further embodiment of the invention.

Referring now to the drawing in detail, the guided transport means shown in FIGS. 1-3 comprise primarily the track 1 and the partially illustrated vehicle 5 which by means of a magnetic supporting system 6 rests on the supporting part 4 of the track. The drive is not shown. For the drive of the vehicle cars there may be used, for instance, linear motors which cooperate with portions of the vehicle guiding means of the track.

Figure 4:
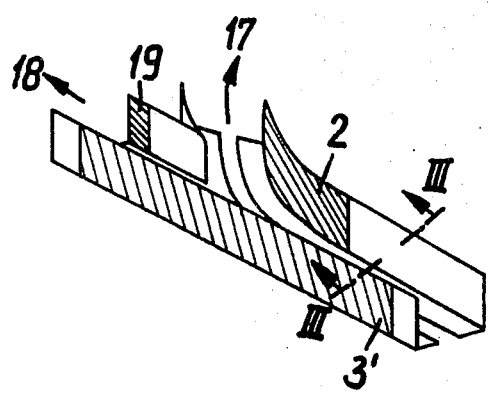
FIG. 4 is an isometric view of a branching off track without vehicle thereon and provided with soft magnetic material according to the design of FIG. 3.

The track branch-off illustrated in FIG. 4 has in conformity with the present invention an emergency running direction (arrow 17) and a selective running direction (arrow 18). Viewed in the direction of the arrows 17 and 18, the respective right-hand track guiding part forms the emergency track side while the left-hand track guiding part forms the selective track side.

FIG. 4 shows the problem to be solved by the invention. More specifically, the vehicle when coming into the area of the branch-off should be adapted to be driven from the vehicle proper selectively in the direction of the arrow 17 or in the direction of the arrow 18. On the other hand, in case of a failure of the control energy, it should be possible to drive the vehicle into a predetermined direction, namely into the emergency direction according to arrow 17. This goal has been realized according to the various embodiments of the invention as follows:

In the design of FIG. 1, a permanent magnet 7 is fixedly arranged on the emergency side of the vehicle 5, in other words, corresponding to the emergency side of the vehicle guiding part 2 of the track 1. Likewise fixedly connected to the vehicle 5 on the selective side, corresponding to the selective vehicle guiding part 3, there is arranged a controllable electromagnet 8 the power of which is so selected that it will be able to pull over the vehicle against the force of the permanent magnet from the emergency side 2 to the selective side 3 and to guide the vehicle along the selective side. The vehicle guiding parts 2 and 3 of the track which serve as switch guiding means are within the region of the branching-off area provided with soft magnetic material as indicated by shading.

With normal operation of the vehicle, the electromagnet 8 will not be energized when the driving off in the direction of the arrow 17 occurs, whereas the electromagnet 18 will be energized when driving in the direction of the arrow 18. In conformity with the present invention, the vehicle will, in response to a failure of the control energy, guide itself in a predetermined direction, namely the emergency direction indicated by the arrow 17.

According to the embodiment of FIG. 2, the vehicle 5 in the bearing means 10 has arranged a coupling rod or bar 9 which is displaceable in a direction transverse to the driving direction and which is equipped with abutment cams. Coupling rod 9 has its ends respectively provided with a permanent magnet 7' which is located on the emergency side and with a permanent magnet 11 which is located on the selective side, the magnets 7' and 11 being associated with the corresponding track guiding parts 2 and 3 respectively which are provided with soft magnetic material. The coupling rod 9 is toward the emergency side acted upon by the rest position spring 12 which exerts a pulling action. In the opposite direction, namely toward the selective side, the coupling bar is adapted to be acted upon by a power-operated device 13 counter to the thrust of spring 12. The device 13 may be of an electromagnetic, hydraulic of pneumatic kind, or the like.

The distance between the effective poles of the two permanent magnets is of such magnitude that while one permanent magnet has the normal guiding distance from its track guiding part, the other permanent magnet has a greater distance from its pertaining track guiding part so that its force of attraction is greatly reduced.

For driving into the selective direction, the power-operated device 13 is supplied with control energy. For driving into the emergency direction, the power-operated device 13 is not energized. If the control energy fails accidentally, the rest position spring retains the coupling bar on the emergency side and, more specifically, in contact with an abutment. In this position of the coupling bar, the permanent magnet on the emergency side remains at its normal distance so that it will guide the vehicle on the track guiding part 2 in the emergency direction (arrow 17). The permanent magnet on the selective side in this instance remains at a great distance from the track guiding part on the selective side.

FIG. 3 shows a modification of the arrangement of FIG. 2. Also in this instance a coupling bar 9' is transversely displaceably arranged on the vehicle. The bar 9' is provided with abutment cams and has its ends provided with a permanent magnet 7' on the emergency side and with a permanent magnet 11 on the selective side. In the emergency running position according to FIG. 3, the coupling bar 9' is fixedly held by a locking device which comprises an arresting bore 14 on bar 9' and an arresting pin 15 associated with the bore 14, the arresting pin 15 being operable by the control device 16.

At the same time the vehicle guiding parts of the track are within the region of the branching-off area equipped or fitted with soft magnetic material in a certain way (FIG. 4). The soft magnetic material 3' starts at the selective side earlier than the soft magnetic material 2 at the emergency side. On the other hand, in the selective direction following the branching-off point, a soft magnetic wall piece 19 is provided on the emergency side.

The switch according to FIGS. 3 and 4 operates as follows. To assure that the vehicle 5 will in conformity with the arrow 18 drive into the selective direction, the control device 16 is supplied with control energy so that the arresting pin 15 will be pulled out of the arresting bore 14. The disengagement is effected prior to the permanent magnet 7' reaching the region of the soft magnetic material piece 2 on the emergency side. Inasmuch as the soft magnetic material on the selective side (see FIG. 4) is closer to the branching off point, the permanent magnet 11 pulls itself to the selective side track guiding part 3' while the coupling bar will abut the corresponding abutment cam on the vehicle so that the vehicle will be guided onto the selective side and into the branch indicated by the arrow 18.

By means of the soft magnetic wall piece 19 provided behind the branching-off point on that side of the switch which is located opposite to the side provided with the soft magnetic material 3', in other words is located on the emergency side, the coupling bar 9' is in conformity with FIG. 3 returned to its rest position by means of the permanent magnet 7' on the emergency side. The coupling bar 9' will by engaging the corresponding cam on the vehicle again be in the position in which the arresting pin 15 is aligned with the arresting bore 14 so that the pin 15 can either by its own weight and/or by an arresting spring in the control device 16 again be lowered into the bore 14 for arresting purposes.

In the arrested rest position the switch is by means of the permanent magnet 7' oriented for the emergency side. If the control energy fails, the vehicle will thus be driven in a predetermined direction.

It is, of course, to be understood that the present invention is, by no means, limited to the specific showing in the drawing but also comprises any modifications within the scope of the appended claims.

What we claim is:

1. In combination with a guided transport vehicle and with track means having separate supporting means and guiding means for said vehicle and comprising a first track and at least one second track branching off from said first track, a switch which includes: a permanent magnet connected to said vehicle in the vicinity of but in spaced relationship to that one side of said track means from which said second track branches off, said track means being provided with soft magnetic material within the region where said second track branches off from said first track for cooperation with said permanent magnet to cause said vehicle to be pulled into said second track in response to a predetermined magnetic interaction between said permanent magnet and said soft magnetic material, and power operable means arranged in said vehicle itself and operable selectively from within said vehicle to make said permanent magnet ineffective.

2. In combination with a guided transport vehicle and with track means having separate supporting means and guiding means for said vehicle and comprising a first track and at least one second track branching off from said first track, a switch, which includes: a permanent magnet connected to said vehicle in the vicinity of but in spaced relationship to that one side of said track means from which said second track branches off, said track means being provided with soft magnetic material within the region where said second track branches off from said first track for cooperation with said permanent magnet to cause said vehicle to be pulled into said second track in response to a predetermined magnetic interaction between said permanent magnet and said soft magnetic material, power operable means arranged on said vehicle and operable selectively from said vehicle to make said permanent magnet ineffective, reciprocable means reciprocable in a direction transverse to the traveling direction of said vehicle, that one end portion of said reciprocable means which is adjacent that side of said track means from which said second track branches off having said permanent magnet connected thereto, said permanent magnet forming a first permanent magnet, a second permanent magnet connected to the other end portion of said reciprocable means, but being spaced from the adjacent side of said track means by a distance greater than the distance between said first permanent magnet and the adjacent side of said track means, and holding means associated with said reciprocable means for normally holding said first permanent magnet closer to the adjacent side of said track means than the distance between said second permanent magnet and the adjacent side of said track means, said power operable means including means operable to make said holding means ineffective.

3. A switch according to claim 2, in which said power operable means includes controllable electromagnetic means.

4. A switch according to claim 3, in which said reciprocable means are formed by a rod having said first and second permanent magnets respectively fixedly connected to its ends.

5. A switch according to claim 3, in which said holding means includes a locking device, one element of which is connected to said reciprocable means while another element of said locking device is operable by said power operable means.

6. A switch according to claim 3, in which said soft magnetic material is so arranged within the region where said second track branches off from said first track that when looking in the driving direction of said vehicle the soft magnetic material on the track means starts later on that side from which said second track branches off than on the opposite side of said track means which opposite side pertains to said first track.

7. A switch according to claim 3, in which said first track when looking in the driving direction of the vehicle is shortly behind the region where said second track branches off provided with a soft magnetic wall member located on that side of said first track from which said second track branches off, said magnetic wall member being operable in response to said first permanent magnet passing by said soft magnetic wall member to pull said first permanent magnet back to its normal position if it should be out of said normal position to thereby return said holding means to its normal holding position.

8. In combination with a guided transport vehicle and with track means having separate supporting means and guiding means for said vehicle and comprising a first track and at least one second track branching off from said first track, a switch which includes: a first member in the form of a permanent magnet, a second member formed by soft magnetic material, one of said members being connected to that one side of said track means from which said second track branches off, and the other one of said members being connected to that side of said vehicle which faces toward that side of said track means from which said second track branches off, said first and second members being operable to magnetically cooperate with each other so as to cause said vehicle to be pulled into said second track in response to a predetermined magnetic interaction between said permanent magnet and said soft magnetic material, and power operable means arranged in said vehicle itself and operable selectively from within said vehicle to interrupt magnetic cooperation between said first and second members.

* * * * *